United States Patent
Szalmás

(10) Patent No.: US 10,926,793 B2
(45) Date of Patent: Feb. 23, 2021

(54) COIL TEMPERATURE ESTIMATION

(71) Applicants: THYSSENKRUPP PRESTA AG, Eschen (LI); thyssenkrupp AG, Essen (DE)

(72) Inventor: István Szalmás, Budapest (HU)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 317 days.

(21) Appl. No.: 16/098,664

(22) PCT Filed: Jun. 3, 2016

(86) PCT No.: PCT/EP2016/062709
§ 371 (c)(1),
(2) Date: Nov. 2, 2018

(87) PCT Pub. No.: WO2017/207066
PCT Pub. Date: Dec. 7, 2017

(65) Prior Publication Data
US 2019/0144033 A1 May 16, 2019

(51) Int. Cl.
*B62D 5/04* (2006.01)
*G01K 7/42* (2006.01)
(Continued)

(52) U.S. Cl.
CPC ......... *B62D 5/0496* (2013.01); *B62D 5/0463* (2013.01); *G01K 7/427* (2013.01);
(Continued)

(58) Field of Classification Search
CPC .. B62D 5/0496; B62D 5/0481; B62D 5/0487; B62D 5/0463; B62D 5/04; H02P 29/032; H02P 29/64; H02P 29/028
See application file for complete search history.

(56) References Cited

U.S. PATENT DOCUMENTS 4,789,040 A * 12/1988 Morishita ............ B62D 5/0496
  180/446
4,986,379 A *  1/1991 Morishita ............ B62D 5/0463
  180/446
(Continued)

FOREIGN PATENT DOCUMENTS

CN     101134470 A     3/2008
CN     101820167 A     9/2010
(Continued)

OTHER PUBLICATIONS

International Search Report issued in PCT/EP2016/062709, dated Jan. 18, 2017 (dated Jan. 26, 2017).

*Primary Examiner* — Ruth Ilan
*Assistant Examiner* — Michael R Stabley
(74) *Attorney, Agent, or Firm* — thyssenkrupp North America, LLC

(57) ABSTRACT

Methods for estimation of lost temperature increment after system restart for motor coil temperature estimation in an electric power steering apparatus of a motor vehicle with a power pack including an ECU with a temperature sensor and an electric motor. The methods allow to easily recover the lost heat increment value after restart of the system. Consequently, the estimation of the temperature of the motor coils will start from the correct temperature value. Damage of the motor due to overheat can be prevented. Further a more robust system diagnostics and a more accurate torque signal estimation can be provided.

7 Claims, 2 Drawing Sheets

(51) Int. Cl.
   *H02P 29/032* (2016.01)
   *H02P 29/64* (2016.01)
   *H02P 29/028* (2016.01)
(52) U.S. Cl.
   CPC .......... *H02P 29/028* (2013.01); *H02P 29/032* (2016.02); *H02P 29/64* (2016.02); *G01K 2217/00* (2013.01)

(56) References Cited

U.S. PATENT DOCUMENTS

| | | | | |
|---|---|---|---|---|
| 6,326,753 | B1 * | 12/2001 | Someya | B62D 5/0463 |
| | | | | 180/443 |
| 6,334,503 | B1 * | 1/2002 | Fukumura | B62D 5/046 |
| | | | | 180/443 |
| 6,520,279 | B2 * | 2/2003 | Fukumoto | B62D 5/0496 |
| | | | | 180/446 |
| 6,694,237 | B2 * | 2/2004 | Kifuku | B62D 5/0469 |
| | | | | 180/400 |
| 7,091,686 | B2 * | 8/2006 | Kagei | B62D 5/0463 |
| | | | | 180/412 |
| 7,176,644 | B2 * | 2/2007 | Ueda | H02P 21/0089 |
| | | | | 318/400.14 |
| 7,304,447 | B2 * | 12/2007 | Hirai | H02H 6/005 |
| | | | | 318/434 |
| 8,196,698 | B2 * | 6/2012 | Tamaki | B62D 5/0496 |
| | | | | 180/444 |
| 8,666,602 | B2 | 3/2014 | Oh | |
| 8,972,115 | B1 | 3/2015 | Oh | |
| 2005/0205344 | A1 * | 9/2005 | Uryu | B62D 5/0484 |
| | | | | 180/446 |
| 2005/0269150 | A1 | 12/2005 | Chiaki | |
| 2008/0048591 | A1 | 2/2008 | Hamada | |
| 2013/0033210 | A1 | 2/2013 | Takashi | |

FOREIGN PATENT DOCUMENTS

| | | |
|---|---|---|
| JP | 2001328551 A | 11/2001 |
| JP | 2008062916 A | 3/2008 |

* cited by examiner

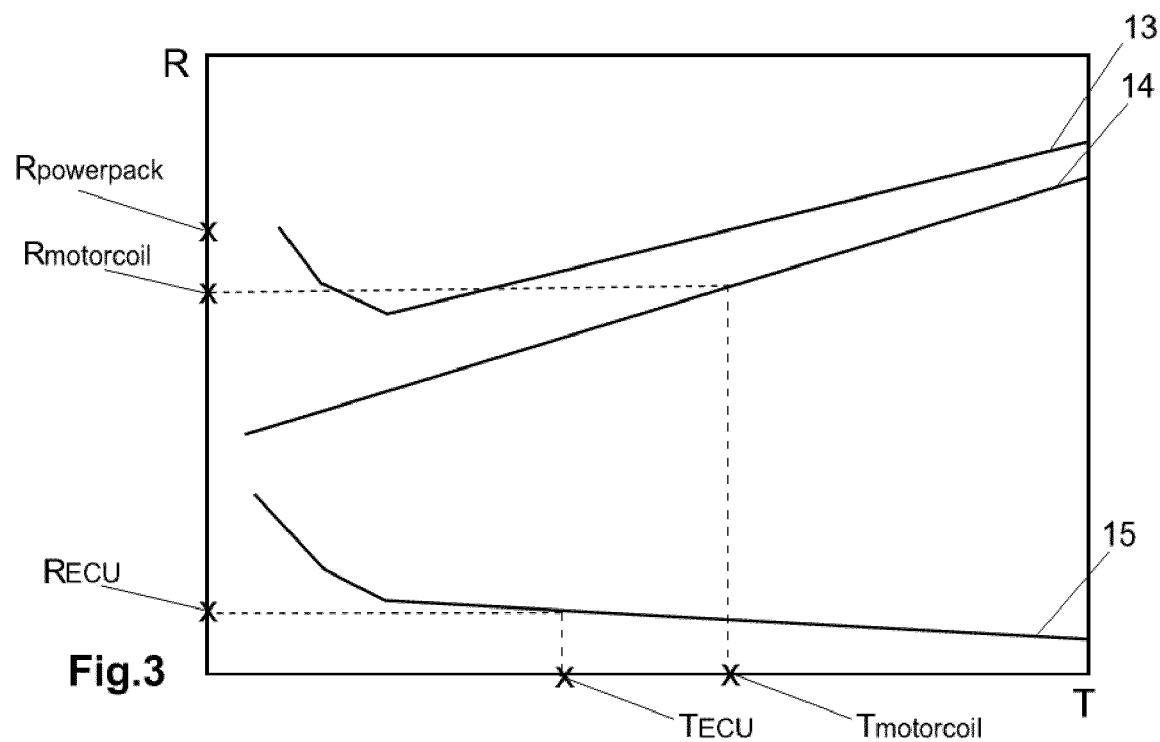

COIL TEMPERATURE ESTIMATION

CROSS REFERENCE TO RELATED APPLICATION

This application is a U.S. National Stage Entry of International Patent Application Serial Number PCT/EP2016/062709, filed Jun. 3, 2016, the entire contents of which are incorporated herein by reference.

FIELD

The present disclosure generally relates to an electric power assisted steering system of a motor vehicle.

BACKGROUND

An electric power assisted steering system of a motor vehicle includes an electric motor that provides an assist power to a turning operation of a steering handle. An electric power steering unit is used to prevent the motor or an electronic control unit (ECU) carrying out a driving control of this motor which overheats the motor and/or causes permanent damage by limiting a current flowing through the motor.

Generally to prevent the motor from being overheated the motor coil temperature is estimated. Generally, the estimated coil temperature is calculated as follows: a base temperature is measured, which is the module or board temperature of the ECU and which is detected by a thermal sensor in the ECU, then a heat increment $T_{Increment}$, which is caused by the dissipated power of motor, is added to the base temperature. In a system restart the incremented heat $T_{Increment}$ gets lost. In order to estimate the correct coil temperature, the estimator has to start from the base temperature again, $$T_{CoilEstimated} = T_{Increment} + T_{ECU} \xrightarrow{\text{System Restart}}$$

$$T_{CoilEstimated} = 0 + T_{ECU} \xrightarrow{\text{Problem}} T_{ECU} \square T_{CoilReal}.$$

During the rebuild of the heat increment the motor is unprotected from overheating. The lost heat increment can be higher than 100° C. After some time the estimator will reach the correct estimated coil temperature, but this might take several minutes up to one hour.

Until the estimated temperature is close to the real temperature of the motor, the motor is not protected from being overheated, which can cause permanent damages and demagnetization of the motor. An inaccurate temperature signal can further cause a failure in diagnostics.

US 2005/0269150 A1 discloses a method how to reduce the load on a battery and improve the starting characteristic of a motor when the ignition switch is changed into OFF state. If an ignition switch changes from OFF state to ON state, an initial value of the current limit value needs to be set and an overheat protection is guaranteed. Therefore, the last state of the controller (before the ignition switch is changed from ON to OFF state) and a process state during the OFF state are stored. However the measurement of the temperature is not precise enough, because it takes into account the motor temperature and not the temperature of the coils.

U.S. Pat. No. 8,972,115 B1 discloses a method for an overheat protection of a power pack entering a failsafe mode, wherein the motor current can be limited. A motor temperature is estimated using thermal resistance and the motor current. The thermal resistance is calculated using the vehicle speed and the power pack temperature. This calculation is not precisely enough, because it takes into account the complete power pack temperature and not the motor coil temperature.

Thus a need exists for an electric power assisted steering system of a motor vehicle with improved estimation of motor temperature to prevent the electric motor from overheating and to provide more accurate and robust diagnostics.

BRIEF DESCRIPTION OF THE FIGURES

FIG. 3 is a graph of the calculated resistances plotted against temperature.

DETAILED DESCRIPTION

Figure 1:
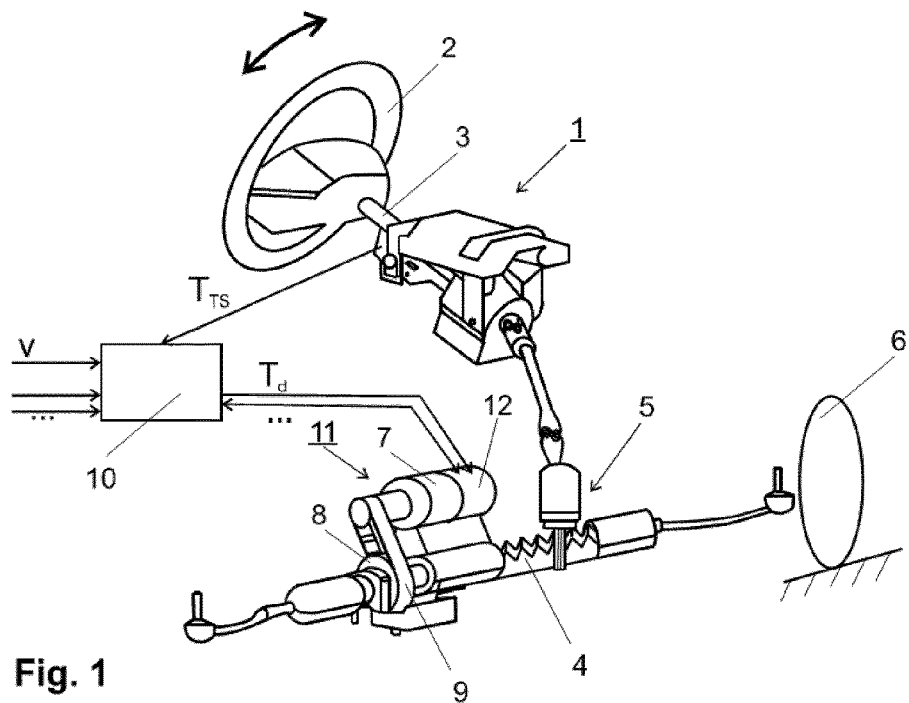
FIG. 1 is a schematic view of an electric power steering apparatus.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to an electric power assisted steering system of a motor vehicle.

In some examples, a method for estimation of lost temperature increment after system restart for motor coil temperature may involve an estimation in an electric power assisted steering system of a motor vehicle.

Accordingly, a method for estimation of lost temperature increment in an electric power steering apparatus of a motor vehicle with a power pack comprising an ECU with a temperature sensor and an electric motor, is provided, said method comprises the steps of:
a) Storing a given resistance curve of the motor coils;
b) Storing a measured resistance curve of the ECU;
c) Measuring a demand voltage vector, a current feedback value $I_{d,fb}$ based on a demand current vector and a battery voltage during a special measurement pulse;
d) Determining a power pack resistance based on the parameters measured in step c);
e) Measuring the temperature of the ECU with the temperature sensor;
f) Determining the resistance of the ECU on basis of the measured temperature in step e) and the stored resistance curve of the ECU;
g) Subtracting the resistance of the ECU from the determined power pack resistance;
h) Determining the temperature of the motor coils based on the value obtained in step g) and the stored resistance curve of the motor coils; and
i) Obtaining the lost temperature increment by subtracting the measured temperature of the ECU from the determined temperature of the motor coils.

Preferably, the motor coil resistance curve is given by $$T_{motorcoil} = \frac{\left(\frac{R_{motorcoil}}{R_0}\right) - 1}{\alpha_{Cu}} + T_0,$$

wherein $T_{motorcoil}$ is the motor coil temperature, $R_{motorcoil}$ the resistance of the coil, $T_0$ the room temperature, $\alpha_{Cu}$ the heat coefficient of the coils' copper and $R_0$ the resistance of the coil at room temperature.

In one embodiment, the motor coil resistance increases with about 39%/100° C.

It is advantageous that the special measurement pulse is so short, that the rotor of the motor does not move. Preferably, the special measurement pulse is less than 25 ms. The motion of the rotor and therefore the motor torque generation is further prevented by using the direction of a demand current vector $I_{d,d}$ and direction of a demand voltage vector $U_{d,d}$.

In a preferred embodiment, the motor coil resistance curve and the measured ECU resistance curve are stored by polynomial equations in the ECU software. The resistance curves can be further stored in look-up tables. In a preferred embodiment the proper polynomial equation can be selected.

Favourably, the motor coil resistance curve and the ECU resistance curve are stored each by two polynomial equations, one for a first and one for a second part, wherein the first and second part are separated by the minimum of resistance of ECU resistance curve.

FIG. 1 is a schematic diagram of an electric power steering apparatus 1. A steering wheel 2 is fixed to a steering shaft 3, and the steering shaft 3 is coupled to a rack 4 via a rack-and-pinion mechanism 5. Rotation of the steering shaft 3 accompanying a steering operation is converted into a reciprocating linear motion of the toothed rack 4 by the rack-and-pinion mechanism 5. The linear motion of the rack 4 changes the steering angle of the steered wheels 6. To provide steering assistance, an electric motor 7 mounted to the side of the rack housing drives a ball-screw mechanism 8 via a toothed rubber belt 9.

Electric power assist is provided through a steering controller (ECU) 10 and a power assist actuator 11 comprising the electric motor 7 and a motor controller 12. The steering controller 10 receives signals representative of the vehicle velocity v and the torque $T_{TS}$ applied to the steering wheel 2 by the vehicle operator. In response to the vehicle velocity v and the operator torque $T_{TS}$, the controller 10 determines the target motor torque $T_d$ and provides the signal through to the motor controller 12, where the duty cycles are calculated to produce the phase currents via PWM (pulse-width modulation). The steering controller 10 including a temperature sensor 16 and the electric motor 7 forms a unit referred to as power pack 100. The power pack 100 can comprise further elements like the motor controller 12 or sensing circuits for sensing currents and/or voltages. The power pack 100 is fed with battery voltage $U_{bat}$.

Figure 2:
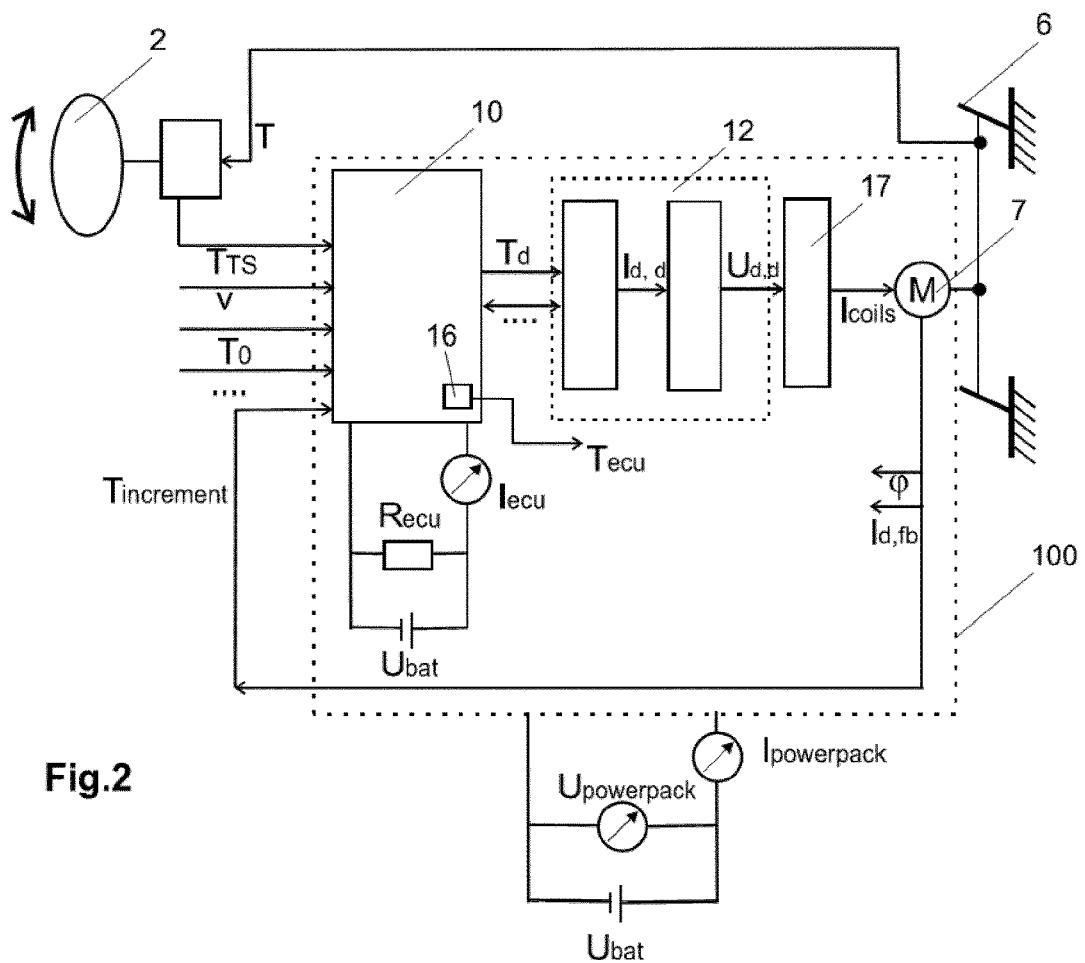
FIG. 2 is a block diagram showing an electrical structure of the electric power steering apparatus.

FIG. 2 shows a block diagram of the electrical structure of the electric power steering apparatus 1. The steering controller 10 receives signals representative of the vehicle velocity v, the torque $T_{TS}$ applied to the steering wheel 2 by the vehicle operator and a base temperature $T_0$ and derives the target motor torque $T_d$. This torque is fed to the motor controller 12 which determines the voltage input for the PWM and a motor driver 17 generates via the PWM the motor currents $I_{coils}=i_U, i_V, i_W$. Hence, the motor 7 generates a torque T which compensates the operator torque $T_{TS}$.

An estimator estimates the temperature of the motor coils to adjust if necessary the current flowing through the motor 7 in order to prevent damage of the motor 7. A temperature sensor 16 measures the temperature $T_{ECU}$ of the ECU 10. The estimator adds to the measured temperature of the ECU $T_{ECU}$ a heat increment $T_{Increment}$.

$$T_{CoilEstimated} = T_{Increment} + T_{ECU}.$$

The heat increment is derived as follows $$T_{Increment} = T_{Increment\,Prev} + \left\{\left(\frac{T_s}{C_{Thermal}}\right) \cdot (P - (T_{Increment\,Prev} \cdot G_{Thermal}))\right\},$$

wherein $T_{Increment}$ is the value of temperature increment to thermal ground in the actual control cycle, $T_{IncrementPrev}$ is the value of temperature increment calculated in the previous running cycle, $T_S=1/f_S$ with $f_S$ the running frequency of the estimator, P is the value of calculated dissipated power of motor in the actual control cycle, $G_{Thermal}$ is the thermal conductance and $C_{Thermal}$ is the thermal capacity.

After restart of the system the lost heat increment $T_{LostIncrement}$ needs to be recovered. This is done with the following method. FIG. 3 shows schematically the resistance curves of the motor coils 14, the ECU 15 and the power pack 13 and the calculation of the motor coil temperature $T_{motorcoil}$.

Before operation of the estimator the resistance of the power pack $R_{powerpack}$ 13 at different temperatures over the relevant range is measured. The power pack resistance curve 13 has a turning-point, separating the curve into a cold and warm part, wherein the turning point can be in a range between 0° C. and 15° C. This turning point is the minimum of the resistance curve of the capacitor. The shape of the resistance curve is representing the different temperature dependencies of the materials and electrical parts of the ECU 10. A polynomial formula for each part of the power pack resistance curve 13 is determined based on the demand voltage vector $U_{d,d}$ and the demand current vector $I_{d,d}$ expressed in a coordinate system fixed to the electrical angular frequency φ of the rotating rotor. The electrical angular frequency φ of the rotating rotor has the same or the opposite direction as the rotor, so the generation of motor torque can be prevented. By using the demand current vector $I_{d,d}$ and the demand voltage vector $U_{d,d}$ self-steering can be prevented.

Further the connection between the motor coil resistance and the temperature of the motor coils, given by $$T_{motorcoil} = \frac{\left(\frac{R_{motorcoil}}{R_0}\right) - 1}{\alpha_{Cu}} + T_0,$$

is stored,
wherein $T_0$ is the temperature of the motor coils at the room temperature.

The resistance of the coil $R_{motorcoil}$ is temperature dependent. The formula depends on the heat coefficient of the coils' copper $\alpha_{Cu}$. Its value is 39%/100° C. Next the difference between the two curves 13, 14 is calculated resulting in the ECU resistance curve 15. This curve is stored in the parameter file by the help of two polynomial equations, one for the warm part and one for the cold part, wherein the proper polynomial equation can be selected.

During operation of the estimator and after restart of the system the lost increment $T_{LostIncrement}$ is estimated with the following method;

At first the resistance of the power pack $R_{powerpack}$ is measured. For that a special measurement pulse is used. The duration of this special measurement pulse is less than 25 ms. During this short time the rotor does not move, no steering assist is provided and the driver will not detect any unusual phenomena, like self-steering of the system. When the power pack 100 is started, the power pack resistance $R_{powerpack}$ is calculated by measurement of the demand voltage value $U_{d,d}$ and a current feedback value $I_{d,fb} = I_{Powerpack}$ is determined which flows into the power-pack based on the the demand current value $I_{d,d}$ and the battery voltage $U_{bat}$ and calculation of the voltage drop $U_{powerpack}$ by $$U_{powerpack} = U_D \cdot \left(\frac{2}{3} \cdot U_{bat}\right)$$

and by $$R_{powerpack} = \frac{U_{powerpack}}{I_{powerpack}}.$$

A thermal sensor 16, wherein the thermal sensor and the temperature sensor describe the same element, integrated in the ECU 10 measures the temperature of the ECU $T_{ECU}$. The proper resistance value of the ECU $R_{ECU}$ can then be determined by the measured temperature $T_{ECU}$ and the respective part (cold or warm) of the pre-stored ECU resistance curve. In the next step, the motor coil resistance $R_{motorcoil}$ is determined by subtracting the ECU resistance value $R_{ECU}$ from the resistance of the power pack $R_{powerpack}$. With the use of the stored motor coil resistance curve 14 and the calculated motor coil resistance $R_{motorcoil}$, the motor coil temperature $T_{motorcoil}$ can be calculated. After that the lost heat increment $T_{LostIncrement}$ is determined, is which is the difference between the calculated motor coil temperature $T_{motorcoil}$ and the ECU measured temperature $T_{ECU}$, $$T_{LostIncrement} = T_{motorcoil} - T_{ECU}.$$

This way the estimator can be restarted not from the base temperature ($T_{ECU}$) but with an estimated incremented value $T_{LostIncrement}$.

The estimated motor coil temperature $T_{CoilEstimated}$ is then calculated during system initialization by $$T_{CoilEstimated} = T_{LostIncrement} + T_{ECU}.$$

After that the estimator proceeds with $T_{Increment}$, whereas in the first calculation cycle $T_{LostIncrement}$ is used as $T_{IncrementPrev}$;

$$T_{CoilEstimated} = T_{Increment} + T_{ECU} \xrightarrow{System\ Restart} T_{Increment} = T_{LostIncrement} \Rightarrow T_{CoilEstimated} = T_{LostIncrement} + T_{ECU} \approx T_{CoilReal}$$

Finally right from the start, the electric motor 7 is operated with the correctly estimated motor coil temperature.

The method according to the present invention allows to easily recover the lost heat increment value after restart of the system. Consequently, the estimation of the temperature of the motor coils will start from the correct temperature value. Damage of the motor due to overheat can be prevented. Further a more robust system diagnostics and a more accurate torque signal estimation can be provided.

The invention claimed is:

1. A method for estimation of lost temperature increment ($T_{LostIncrement}$) after system restart for motor coil temperature estimation in an electric power steering apparatus of a motor vehicle with a power pack comprising an ECU with a temperature sensor and an electric motor, said method comprising the steps of:
   a) storing a given resistance curve of the motor coils;
   b) storing a measured resistance curve of the ECU;
   c) measuring a demand voltage vector ($U_{d,d}$), a current feedback value $I_{d,fb}$ based on a demand current vector ($I_{d,d}$) and a battery voltage ($U_{bat}$) during a special measurement pulse;
   d) determining the power pack resistance ($R_{powerpack}$) based on the parameters measured in step c);
   e) measuring the temperature of the ECU ($T_{ECU}$) with the temperature sensor;
   f) determining the resistance of the ECU ($R_{ECU}$) on basis of the measured temperature in step e) and the stored resistance curve of the ECU;
   g) subtracting the resistance of the ECU ($R_{ECU}$) from the determined power pack resistance ($R_{powerpack}$);
   h) determining the temperature of the motor coils ($T_{motorcoil}$) based on the value obtained in step g) and the stored resistance curve of the motor coils; and
   i) obtaining the lost temperature increment ($T_{LostIncrement}$) by subtracting the measured temperature of the ECU ($T_{ECU}$) from the determined temperature of the motor coils ($T_{motorcoil}$).

2. The method of claim 1, wherein the motor coil resistance curve is given by $$T_{motorcoil} = \frac{\left(\frac{R_{motorcoil}}{R_0}\right) - 1}{\alpha_{Cu}} + T_0,$$

wherein $T_{motorcoil}$ is the motor coil temperature, $R_{motorcoil}$ the resistance of the coil, $T_0$ the room temperature, $\alpha_{Cu}$ the heat coefficient of the coils' copper and $R_0$ the resistance of the coil at room temperature.

3. The method of claim 1, wherein the motor coil resistance ($R_{motorcoil}$) increases with a gradient of about 39%/100° C.

4. The method of claim 1, wherein the special measurement pulse is of an extent such that the rotor of the motor does not move.

5. The method of claim 1, wherein the special measurement pulse is less than 25 ms.

6. The method of claim 1, including storing the motor coils resistance curve and the ECU resistance curve by polynomial equations.

7. The method of claim 1, including storing the motor coils resistance curve and the ECU resistance curve each by two polynomial equations, one for a first and another for a second part, wherein the first and second part are separated by the minimum of resistance of the ECU resistance curve.

* * * * *